United States Patent [19]

Guichard

[11] Patent Number: 4,572,585
[45] Date of Patent: Feb. 25, 1986

[54] SYSTEM FOR CONTROLLING A BRAKE ACTUATOR ON A VEHICLE, PARTICULARLY AN AIRCRAFT

[75] Inventor: Jean Guichard, La Garenne Colombes, France

[73] Assignee: Messier-Hispano-Bugatti, France

[21] Appl. No.: 472,328

[22] Filed: Mar. 4, 1983

[30] Foreign Application Priority Data

Mar. 5, 1982 [FR] France ................................ 82 03669

[51] Int. Cl.⁴ ............................................. B60T 13/68
[52] U.S. Cl. ......................................... 303/3; 303/20; 303/92; 188/181 C; 244/111
[58] Field of Search .................... 303/92, 3, 20, 11, 15, 303/114, 115, 116, 117, 112, 113, 95, 103, 104, 100; 188/151 A, 181 A, 181 C, DIG. 1, DIG. 2; 244/111

[56] References Cited

U.S. PATENT DOCUMENTS 3,382,012 5/1966 Lucien ................................ 303/113
3,718,374 2/1973 Ochia ................................. 303/109
3,802,745 4/1974 Strifler et al. ....................... 303/113

Primary Examiner—Duane A. Reger
Assistant Examiner—Alvin Oberley
Attorney, Agent, or Firm—Sughrue, Mion, Zinn, Macpeak and Seas

[57] ABSTRACT

The braking control system includes a generator for generating a first electrical control signal, a controllable fluid source suitable for delivering the fluid at a predetermined pressure at an outlet from the source, a slide valve for connecting the outlet of the source to a brake actuator, a circuit for measuring the value of the pressure at the outlet from the source, a circuit being suitable for delivering a second signal having a value representative of the measured pressure, and a controller for controlling the source of fluid as a function of the first and second signals in such a manner that the fluid pressure at the outlet from the source has a value which is a function of the first signal as corrected by the second signal.

4 Claims, 4 Drawing Figures

SYSTEM FOR CONTROLLING A BRAKE ACTUATOR ON A VEHICLE, PARTICULARLY AN AIRCRAFT

The present invention relates to systems for controlling vehicle brake actuators, particularly for aircraft, the systems using pressure controlled servo-valves.

BACKGROUND OF THE INVENTION

To control the braking system of an aircraft, it is already known to use a pressure controlled servo-valve to deliver fluid under pressure to pistons which operate brakes that are disposed on the wheels of the aircraft undercarriage. In rough outline, such braking systems include means for varying the pressure applied to brake actuators such as pistons or jacks as a function of an electrical control signal which is derived from various electrical signals, including a signal resentative of a command from the pilot as detected by suitable sensor means.

Said means are generally known, and the present Applicant has already filed patents for such systems.

However, and again very much in outline, said signals are usually generated as a function of the position of a control pedal operable by the aircraft pilot. The position of the pedal is converted into an electric signal which is applied to the input of a servo-valve. Such a device is described, in particular, in the Applicant's published French patent applicaton No. 2 212 498.

It is recalled that such a servo-valve is controlled by means of electric currents which are applied to magnetic windings to set up a magnetic flux tending to change the position of fluid control means which in turn vary the pressure obtained at a utilisation output from said servo-valve.

In some such devices, the delivered pressure is at a maximum when the input current is nil, and conversely the pressure is nil when the input current is at a maximum.

In any event, generally speaking, the result is that the fluid pressure at the utilisation output from such a servo-valve is proportional to the extent to which the brake pedal is depressed.

In this way, when a pilot wishes to apply the brakes of the aircraft, he depresses the brake pedal to a greater or lesser extent in the same way as do the drivers of cars. However, in the present case, the transmission means from the pedal to the brake is not entirely hydraulic, but is partially electric and partially hydraulic. It is only on reaching the servo-valve that the electrical signal is transformed into a fluid pressure signal for controlling the brake pistons, and in particular the pistons on disk brakes located near the undercarriage wheels.

The braking system summarised above is relatively simple, at least in theory. It therefore gives good results and is also practical and cheap.

However, under some circumstances it has a drawback. The accuracy of the braking effect obtained depends mostly on the characteristics of the servo-valve. ie. on the quality of the transformation of the electrical signal at its input into a useable fluid pressure at its output.

Thus on some servo-valves, differences have been observed between the input signals (in electrical form) and the output signals (in fluid form) due, for example, to manufacturing tolerances. However, such differences can also be due to the servo-valve ageing, which ageing may be aggravated by the use of hydraulic liquids that are corrosive.

Preferred embodiments of the present invention provide a servo-valve system for controlling a vehicle brake actuator, eg. for an aircraft, in such a manner that vehicle braking is independent of variations in the characteristics of servo-valves used, and in which the values of said characteristics are monitored so that an appropriate alarm signal is be generated, if necessary, thereby increasing the safety of a vehicle braking system.

SUMMARY OF THE INVENTION

The present invention provides a system for controlling a brake actuator, wherein the system comprises:

first means for generating a first electrical control signal;

a controllable fluid source suitable for delivering said fluid to outlet means from said source at a pressure which varies as a function of a control signal applied thereto;

second means for connecting the outlet of said source to said brake actuator;

third means for measuring the value of the pressure at said outlet from said source, said third means being suitable for delivering a second signal having a value representative of said measured pressure; and means for controlling said source of fluid as a function of said first and second signals in such a manner that the fluid pressure at the outlet from said source has a value which is a predetermined function of said first signal.

BRIEF DESCRIPTION OF THE DRAWINGS

Embodiments of the present invention are described by way of example with reference to the accompanying drawings, in which.

MORE DETAILED DESCRIPTION

Figure 1:
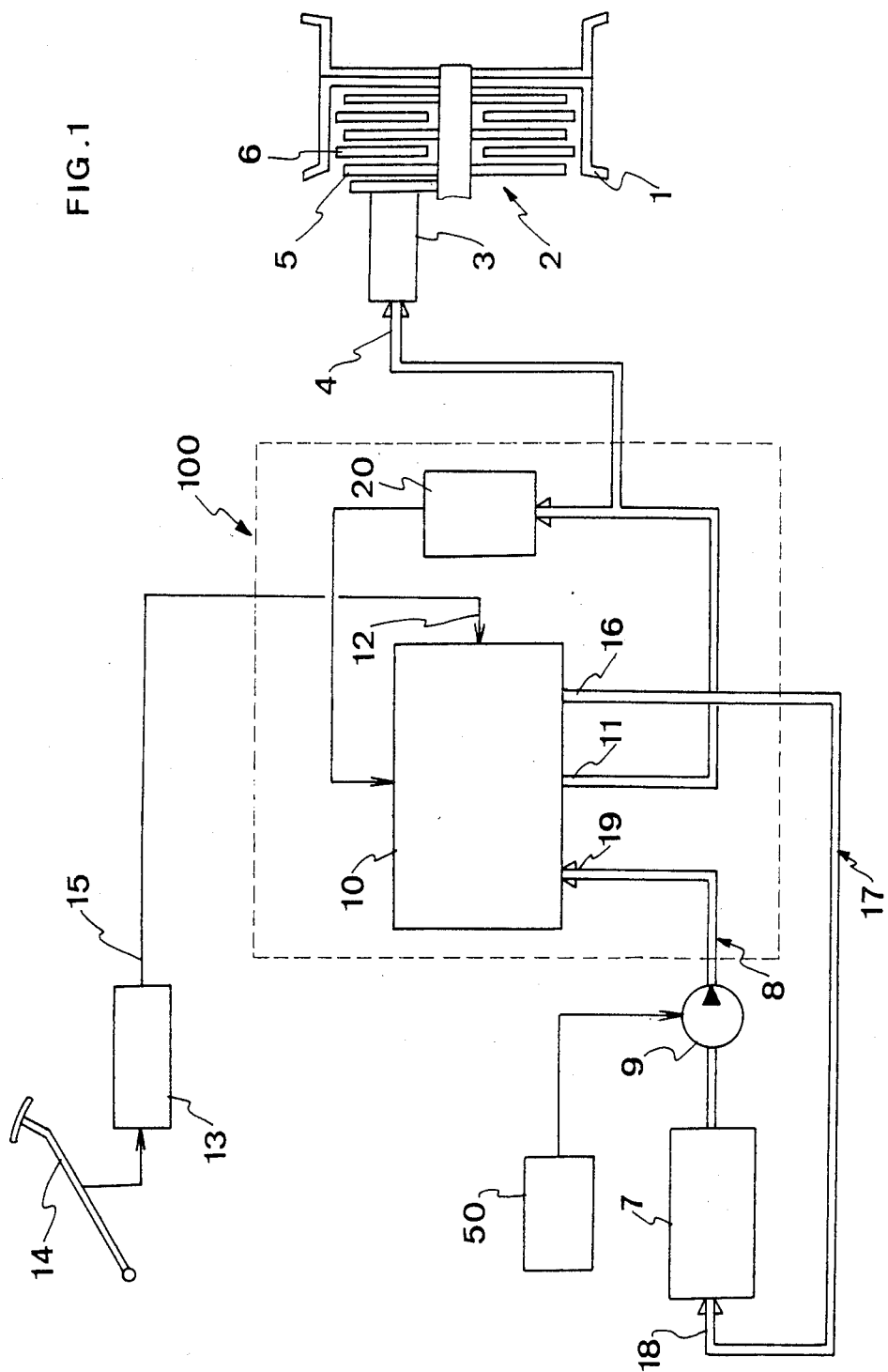
FIG. 1 is a schematic block diagram of a servo-valve braking system for a vehicle such as an aircraft for example.

FIG. 1 is a schematic diagram of a particular braking system for a vehicle such as an aircraft, for example. The system comprises a disk brake assembly 2 mounted on a wheel 1 and controllable by a piston-jack 3 which serves, when fluid under pressure is applied to its inlet 4, to draw together the stator disks 5 and the rotor disks 6 of a disk brake. Further, the system includes a source of fluid 7 connected to a first conduit 8 having pump means 9 for pressurising the fluid in the source 7. Said pump means 9 may be constituted by a hydraulic pump with a power supply 50, eg. a source of electricity.

Said first fluid conduit is connected to the inlet 19 of source means 10 for modulating the pressure of the fluid applied to the inlet 19. Fluid at variable pressure is thus obtained at the outlet 11 of said means 10. The outlet 11 has a fluid connection to the inlet 4 of the piston 3. The fluid source means 10 is constituted by a servo-valve. The servo-valve 10 is controlled by an electrical signal applied to its input 12.

The signal is generated by a generator 13, itself controlled, particularly in the case of an aircraft, by a pedal 14. The generator 13 has an output 15 at which it delivers a signal which is a function of the position of the pedal 14, ie. as the pilot (in the case of an aircraft) presses the pedal down, the generator 13 produces a signal at its output 15 which varies as a function of the position of the pedal 14.

The servo-valve further includes a return outlet 16 which is connected by a second fluid conduit 17 to the return inlet 18 of the fluid source 7.

The fluid is usually constituted by an incompressible oil with characteristics which are well known to users.

As mentioned above, the servo-valve 10 is controlled by means of an electrical signal applied to its input 12. Normally the servo-valve should accurately convert the value of an electrical signal applied to its input 12 into a proportional value of fluid pressure delivered from its utilisation outlet 11.

However, it sometimes happens, for the reasons mentioned above, that servo-valves do not accurately convert the value of the electrical signals applied to their inputs.

To mitigate this possible defect, the circuit includes means for correcting servo-valve drift. These means are shown as a block 20 in FIG. 1, and they serve to measure the value of the fluid pressure delivered at the utilisation outlet 11 and to generate a signal corresponding to said value in order to correct the value of the fluid pressure obtained at the outlet 11 of the servo-valve 10.

Figure 2:
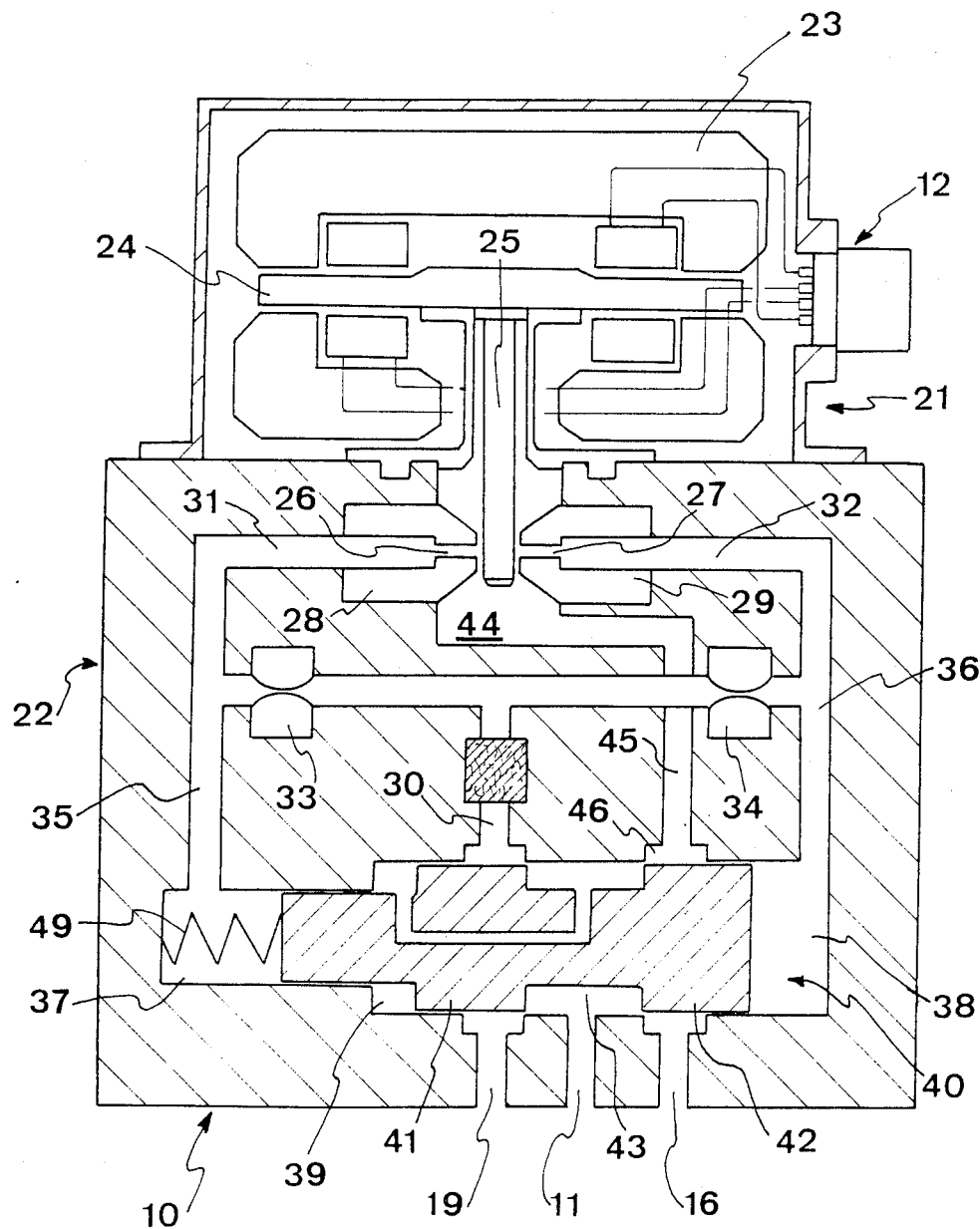
FIG. 2 is a diagrammatic cross section through one embodiment of a servo-valve such as outlined in FIG. 1.

In order to understand the operation of the control circuit, FIG. 2 is a diagrammatic cross section through one particular embodiment of a servo-valve suitable for use as the valve 10 in FIG. 1. Such servo-valves are well known, and particular reference is made to French Pat. No. 2 212 498.

In brief outline it is recalled that such a servo-valve is essentially a two-stage device having a primary stage 21 and a secondary stage 22.

The primary stage includes magnetic means 23 which produce electromagnetic forces in the magnetic circuit 23 in response to the control input 12. Said forces position a core 24 which carries a vane 25 suitable for co-operating with two openings 26 and 27 belonging to respective nozzles 28 and 29.

The secondary stage 22 has a first circuit 30 running from the utilisation inlet 19 via two head loss constrictions 33 and 34 to apply the pressure available at said inlet 19 to the respective inlets 31 and 32 of said nozzles 28 and 29.

The inlets 31 and 32 of the nozzles 28 and 29 are also connected via respective conduits 35 and 36 to two annular chambers 37 and 38 in a bore 39 which includes a slide 40 slidably mounted therein. The slide is optionally subjected to the action of a return spring 49. The bore 39 has two outlets opening out therefrom: a first outlet 11 which constitutes the utilisation outlet from the servo-valve, and a second outlet 16 which constitutes the return outlet to the source.

In the embodiment illustrated, the slide 40 has two projecting portions 41 and 42, and depending on the position of the slide, said projecting portions can, in a home position, completely close the inlet 19 from both outlets 11 and 16, while in other positions of the slide 40, the portions 41 and 42 open the inlet 19 to a degree which is determined by the pressures applied in the opposing annular chambers 37 and 38 such that fluid is enabled to pass via an annular chamber 43 to supply the utilisation orifice 11. Likewise, by moving in the opposite direction, the slide 40 opens the outlet orifice 16 while closing the inlet 19 so that the fluid under pressure at the utilisation outlet 11 returns to the source, thereby reducing the value of the pressure at the utilisation outlet 11.

Such a servo-valve is well known per se, and can be used without particular difficulty. In known manner, the pressure at the outlet 11 is varied by varying the value of the electrical signal applied to the magnetic circuit 23, thereby re-positionning the vane 25 so that it obtructs one of the nozzle outlet orifices 26 and 27 more than the other. Such selective obstruction of the orifices varies the pressure in each of the chambers 37 and 38 such that the difference between said opposing pressures varies as a function of the position of the vane 25 relative to the outlets 26 and 27 of the two nozzles 28 and 29. The slide 40 then moves as a function of said pressure difference, thereby varying the degree of communication between the inlet orifice 19 and the outlet orifice 11, thereby varying the pressure of the utilisation fluid.

Figure 3:
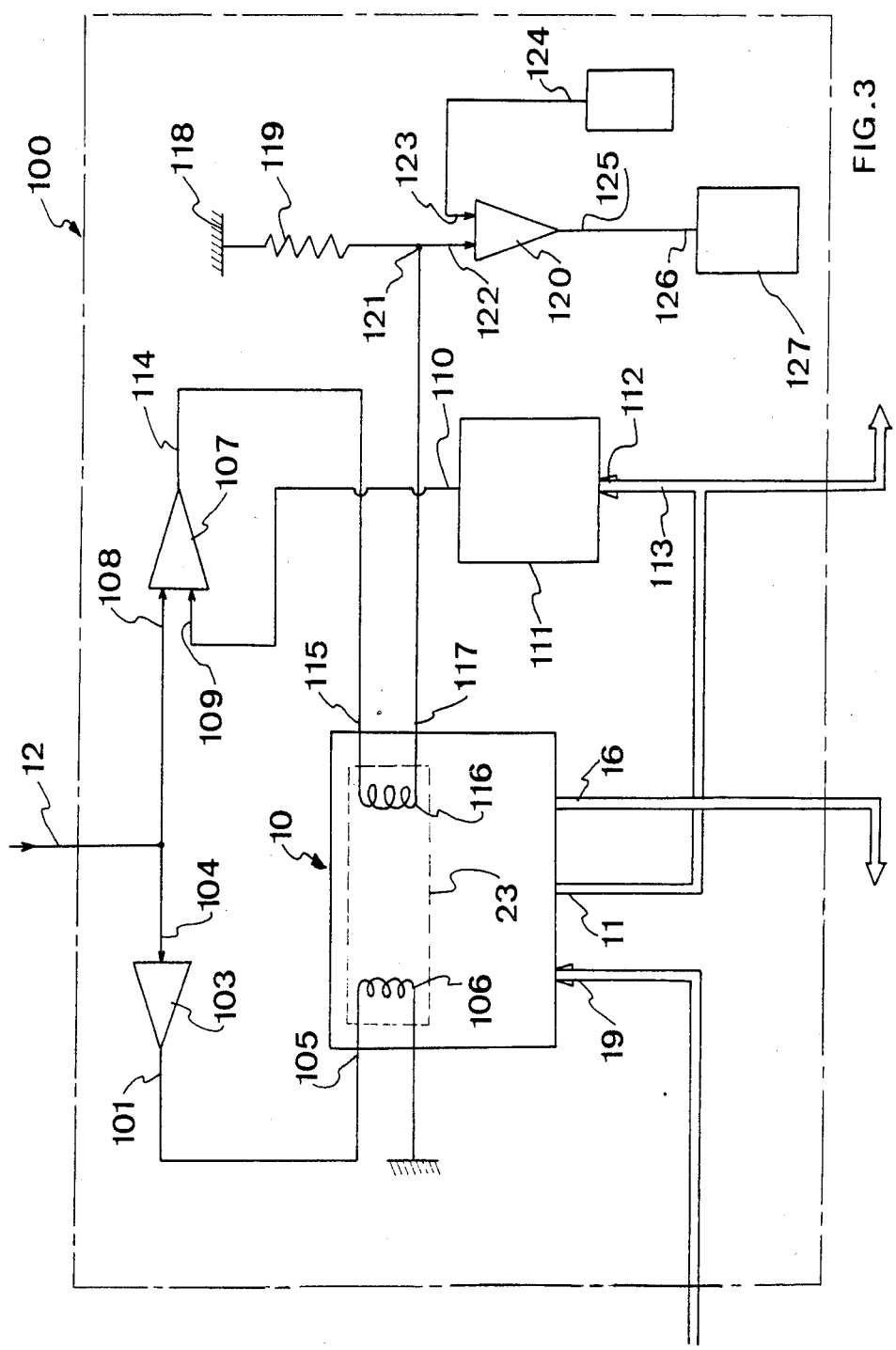
FIG. 3 is a diagram of a first system for controlling a brake actuator, and in accordance with the invention.

FIG. 3 is a diagram of a braking control system designated by a block 100 in FIG. 1.

Thus the block 100 has its control input 12 connected to a current generator 103 having an input 104 connected to receive the control voltage present on the input 12.

The output 101 from the current generator 103 is connected to supply current to the input 105 of one 106 of the two windings, 106, 116 in the magnetic circuit 23.

Further, the input 12 is connected to a comparator 107, eg. an operational amplifier, having one input 108 connected to the input 12 to receive the signal from the generator 13 and a second input 109 connected to the output 110 of a pressure detector 111.

The pressure detector has a fluid inlet 112 connected via a length of conduit 113 to the outlet 11 from the servo-valve 10 as described above.

The pressure detector delivers an electrical signal at its output representative of the fluid pressure present at the outlet from the electro-valve 10.

Further, the comparator 107 has an output 114 which is connected to supply current to the input 115 of the second winding 116 of the magnetic circuit 23.

Advantageously, the block 100 also includes means for measuring the current delivered from the comparator output 114. These means may be constituted by a dropping resistance 119 connected in series between the output 117 from the second winding 116 and a terminal 118 connected to a reference potential. Means 120 are connected to detect voltage variations at the live terminal 121 of said resistance 119. Said means 120 may comprise a threshold detector constituted, for example, by a differential amplifier having one input 122 connected to the terminal 121 of the resistance 119, and a second input 123 connected to the output 124 from a reference source.

The output 125 from the detector means 120 is connected to the input 126 of means 127 for informing a user simply about the signal obtained at the output 125.

Said means 127 may, for example, be a transducer for transforming the electrical signal into a visual signal or into a sound signal.

The circuit shown in FIG. 3 operates as follows:

The voltage signal applied to the input 12 is representative of a desired pressure setting to be applied to the actuator which controls the brakes. Since this signal is applied to the input of the generator 103, its output 101 delivers a current whose value is proportional to the voltage. The current is fed to the winding 106 in order to control the servo-valve in conventional manner by varying, as mentioned above, the position of the vane 25 relative to the two nozzle outlets. The fluid pressure obtained at the outlet 11 is thereby varied, causing the actuator to move in accordance with the signal applied to the input 12.

At the same time the pressure detector 111 delivers a signal representative of the value of the presure obtained, and this value is compared with the value of the signal applied to the input 12, ie. the signals applied to the inputs 108 and 109 of the comparator 107 are compared.

If the values of the two signals applied to the inputs 108 and 109 are equal, the outlet pressure measured by the detector 11 matches the pressure indicated by the electrical voltage signal applied to the input 12.

In contrast, if there is a difference between the pressure-indicating value of the electric signal applied to the input 12 and the pressure actually obtained at the outlet 11, the comparator 107 will deliver a signal representaive of the difference between the signals applied to its inputs 108 and 109. This signal is applied to the second winding of the servo-valve to bring the pressure to the required value, and this continues until the pressure detector 111 delivers a signal at its output 110 to the input 109 which is equal to the signal at the input 108. This signal is constant and serves to maintain the outlet pressure at the desired value. The outlet pressure is thus forced to match the desired pressure.

The alarm detector enables aircraft pilots in particular to monitor possible anomalies in a brake servo-valve, at least once they have reached some threshold value, and attention can be drawn to the fact that the servo-valve is not giving satisfaction. To do this, the signal at the output 114 from the comparator 107 is compared by the detector 120, and when it no longer has the required value relative to the reference signal applied to its input 123, the detector 120 delivers a signal at its output 125 for connection to a lamp or a dial for drawing a pilot's attention thereto so that suitable action can be taken.

The embodiment just described with reference to FIG. 3 is advantageous for use with servo-valves having two control windings as shown in FIG. 2.

Figure 4:
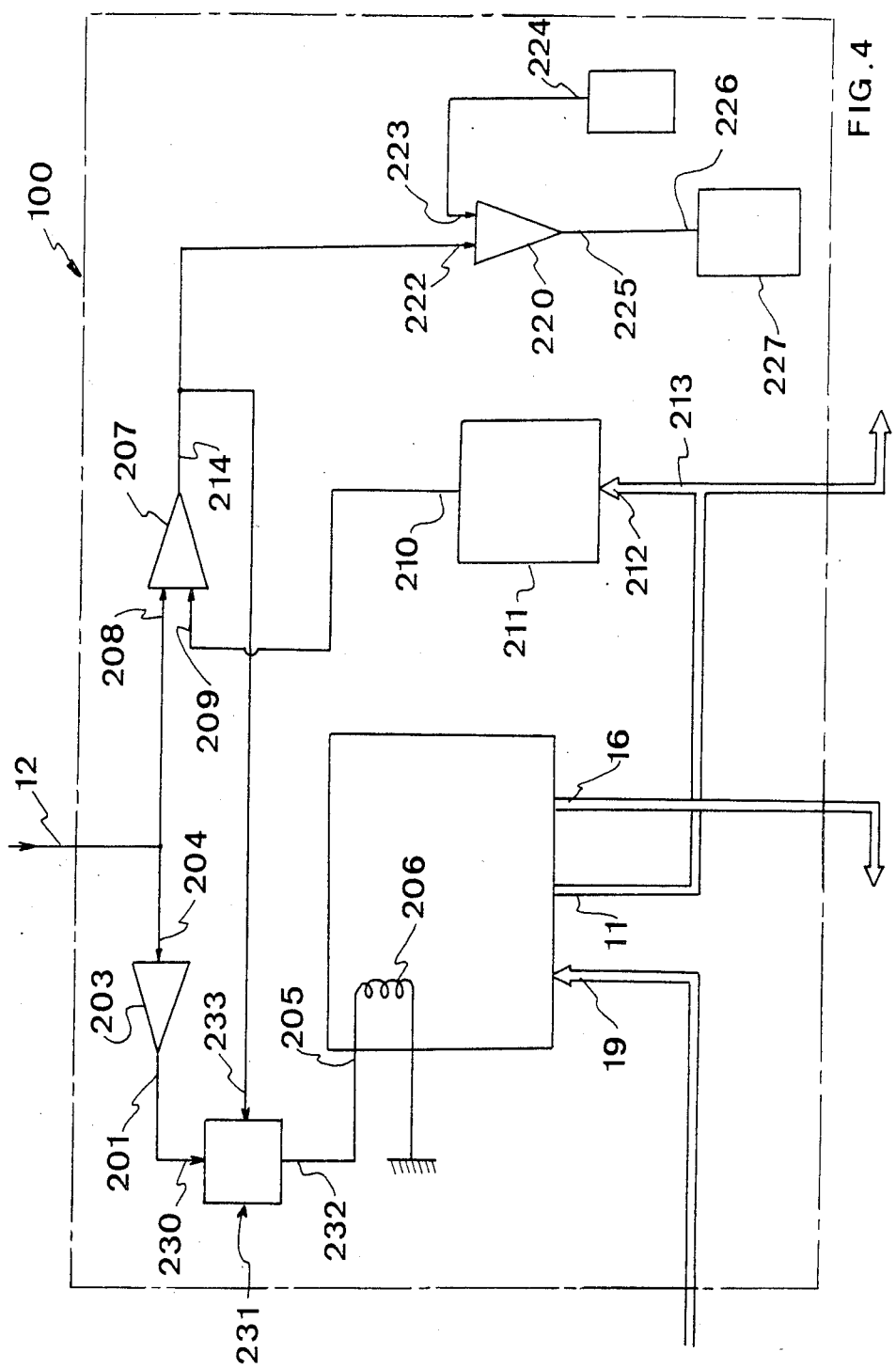
FIG. 4 is a diagram of a second system for controlling a brake actuator, and in accordance with the invention.

However, there are servo-valves which have only one control winding. FIG. 4 is a diagram of a control circuit embodying the invention, and suitable for use with a servo-valve having only one control input (ie. only one winding).

In this embodiment of the invention, the control circuit 100 shown in FIG. 4 comprises a current generator 203 having a control input 204 connected to the input 12. The current generator transforms the value of the voltage applied to its input 204 into a proportional value of current at its output 201 which is connected to one input 230 of a summing circuit 231.

A comparator 207 has one input 208 connected to the input 12. The other input 209 of the comparator 207 is connected to the output 210 from a pressure detector 211 having a fluid inlet 212 connected to the outlet 11 via a conduit 213. The detector 211 is identical to the detector 111 described with reference to FIG. 3.

The output 214 from the comparator 207 is connected to the second input 233 of the summing circuit 231.

The output 232 from the summing circuit 231 is connected to the control input 205 of the sole winding 206 in the servo-valve.

Likewise the circuit 100 further includes alarm means, and this is implemented by connecting the output 214 to the input 222 of a threshold detector or comparator 220 having a reference input 223 connected to the output 224 of a reference signal generator.

Likewise, the output 225 of a comparator 220 is connected to the input 226 of means 227 for transferring the signal obtained at the output 225 into a signal usable by users such as aircraft pilots.

The above-described control circuit operates as follows:

So long as the pressure obtained at the output 11 actually corresponds to the voltage applied to the input 12, the presssure detector delivers a signal at its output 210 which is identical to the signal applied to the input 12, in which case the comparator 207 delivers a zero output signal and the summing circuit 231 transmits the current applied thereto from the output 201 of the current generator 203 in full and without modification.

However, if the servo-valve drifts, the pressure obtained at the utilisation outlet 11 ceases to match the voltage applied to the input 12.

Thus, the pressure detector delivers a signal at its output 210 representative of the pressure obtained at the outlet 11 which signal differs from the signal applied to the input 12. The comparator 207 receives these differing signals on its inputs 208 and 209 and delivers a signal to its output 214 proportional to the difference. The difference is then applied to the input 233 of the summing circuit, where it is added to the signal obtained at the output 201 so that the algebraic sum of said control currents is applied to the input 205 of the winding 206, thereby applying a correction to the servo-valve so that it actually delivers the desired pressure at its outlet 11.

As in the embodiment described with reference to FIG. 3, the control circuit 100 includes an alarm system which in the present case is constituted as before, ie. by means of a threshold detector controlling means for drawing the attention of a pilot when the signal obtained at the output 214 exceeds a predetermined threshold which is fixed by the signal obtained at the output from the reference source 224.

Thus, when the servo-valve drifts by too great an amount, ie. when the value of the signal obtained at the output from the comparator 207 exceeds a given threshold, the comparator 220 delivers a signal which controls an alarm system 227 which may be constituted in the same manner as described with reference to FIG. 3.

I claim:
1. A system for controlling a brake actuator, said system comprising:
first means for generating a first electrical control signal;
a controllable fluid source for delivering fluid to outlet means from said source at a pressure which varies as a function of said first control signal applied thereto;
second means for connecting the outlet of said fluid source to said brake actuator;
third means for measuring the value of the pressure at said outlet from said source, said third means including means for delivering a second signal having a value representative of said measured pressure;

means for controlling said source of fluid as a function of said first and second signals in such a manner that the fluid pressure at the outlet from said source has a value which is a predetermined function of said first signal;

means for generating a third signal as a function of said second signal, first comparator for comparing said third signal with a fourth, reference signal, and alarm means and wherein the output from said comparator means is connected to said alarm means for controlling said alarm means.

2. A system according to claim 1, wherein said controllable source of fluid comprises a servo-valve having two control inputs corresponding to two exciter windings, and wherein the means for controlling said source comprises a second comparator having two inputs respectively connected to receive said first and second signals, said second comparator including means for delivering a fifth signal at its output representative of a comparison between said first and second signals, and said system further including means for applying said first signal to the input of one of said two exciter windings, and means for applying said fifth signal to the input of the other one of said exciter windings.

3. A system according to claim 1, wherein said controllable source of fluid comprises a servo-valve having a single contol input corresponding to a single exciter winding, said means for controlling said source comprises a second comparator having two inputs respectively connected to receive said first and second signals, said second comparator including means for delivering a fifth signal representative of the comparison, means for generating a sixth signal as a function of said first and fifth signals, and means for applying said sixth signal to the input of said winding.

4. A system according to claim 3, wherein said means for generating a sixth signal comprise an algebraic summing circuit.

* * * * *